No. 711,438. Patented Oct. 14, 1902.
J. R. PLACE & N. A. KEYS.
MACHINE FOR SECURING RUBBER TIRES UPON WHEEL RIMS.
(Application filed May 28, 1901.)
(No Model.) 2 Sheets—Sheet 1.
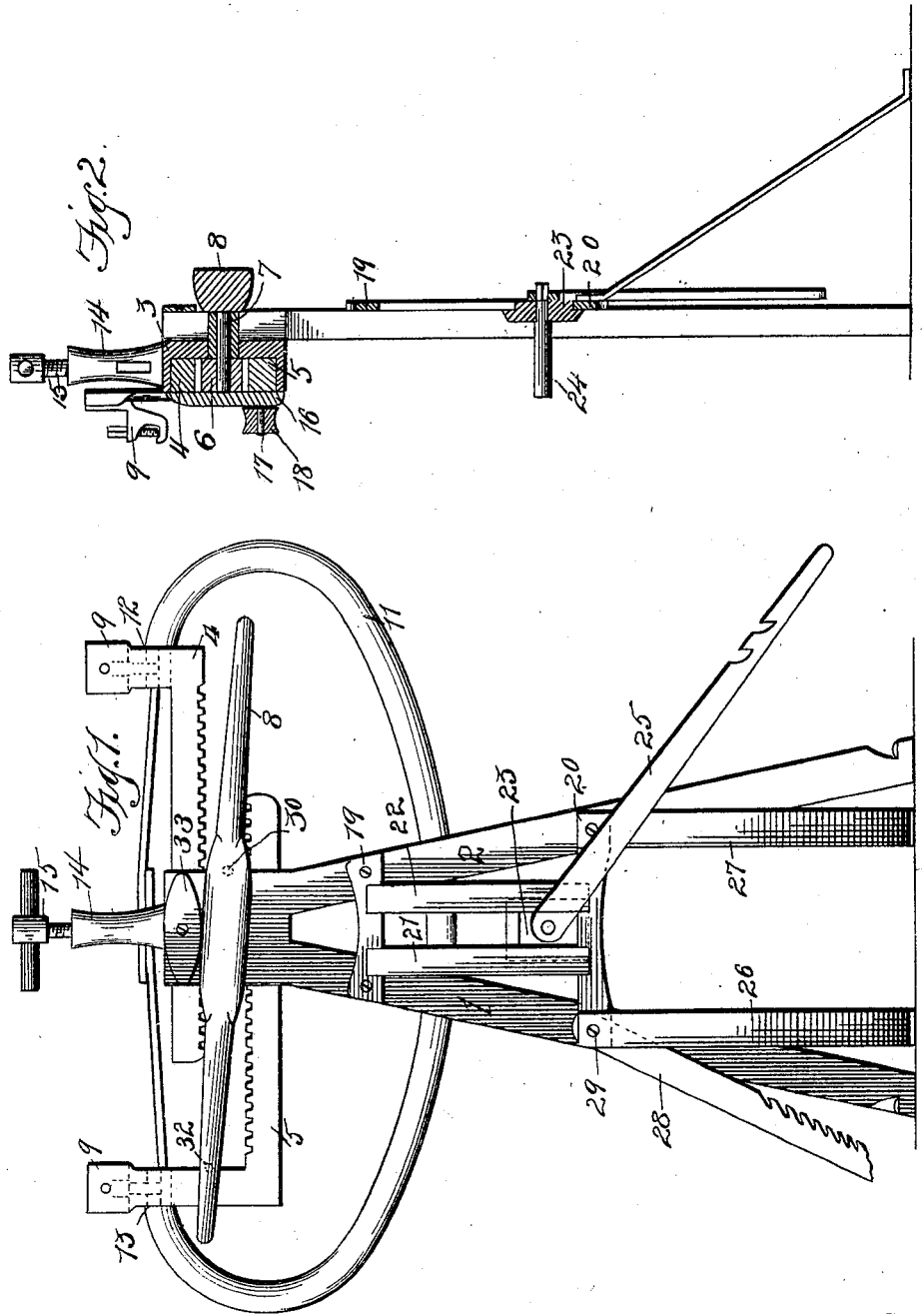
Witnesses
J. F. Pattison
Alice G. Sims
Inventors:
Joseph R. Place
Nathan A. Keys
By
Bacon, Fenwick Lawrence.
Attorneys No. 711,438. Patented Oct. 14, 1902.
J. R. PLACE & N. A. KEYS.
MACHINE FOR SECURING RUBBER TIRES UPON WHEEL RIMS.
(Application filed May 28, 1901.)
(No Model.) 2 Sheets—Sheet 2.
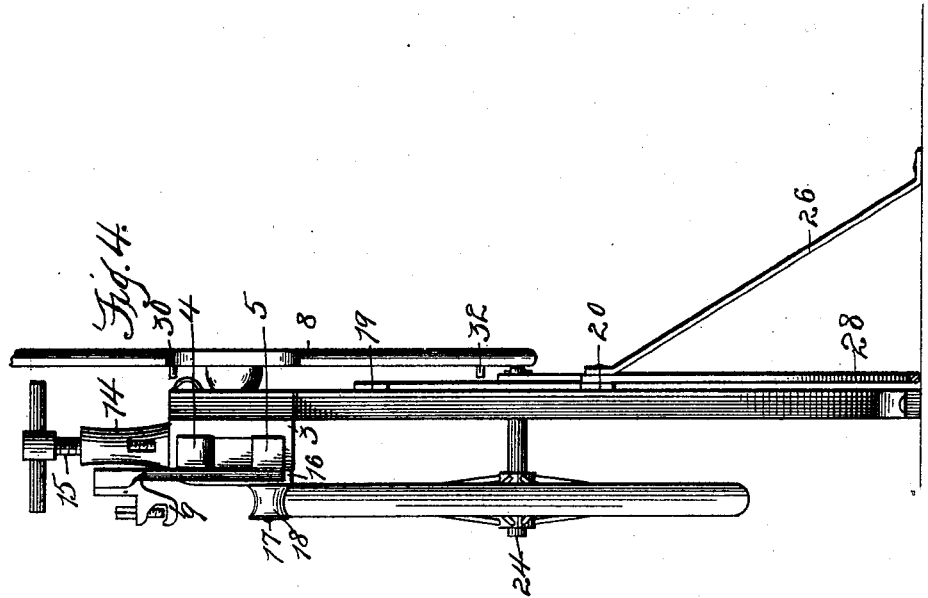
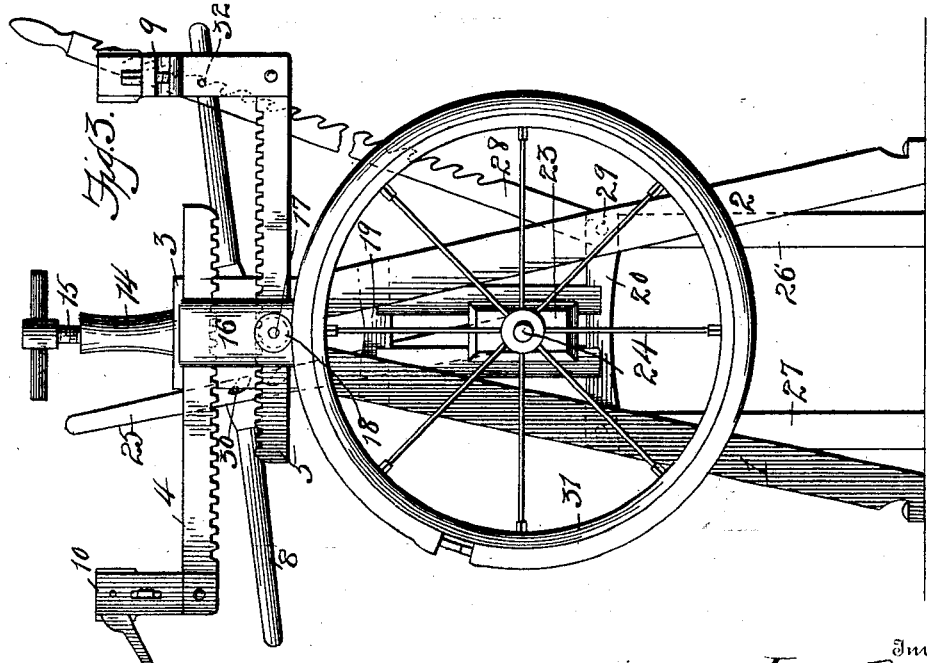
Witnesses
J. F. Pattison
Alice G. Sims
Inventors
Joseph R. Place
Nathan A. Keys
By Mason, Fenwick & Lawrence
Attorneys

UNITED STATES PATENT OFFICE.

JOSEPH R. PLACE AND NATHAN A. KEYS, OF BURLINGTON, IOWA.

MACHINE FOR SECURING RUBBER TIRES UPON WHEEL-RIMS.

SPECIFICATION forming part of Letters Patent No. 711,438, dated October 14, 1902.

Application filed May 28, 1901. Serial No. 62,267. (No model.)

*To all whom it may concern:*

Be it known that we, JOSEPH R. PLACE and NATHAN A. KEYS, citizens of the United States, residing at Burlington, in the county of Des Moines and State of Iowa, have invented certain new and useful Improvements in Machines for Securing Rubber Tires upon Wheel-Rims; and we do hereby declare the following to be a full, clear, and exact description of the invention, such as will enable others skilled in the art to which it appertains to make and use the same.

Our invention is in the nature of a machine for securing rubber tires upon wheel-rims, the object of the invention being to provide an improved machine of this class whereby the tires may be properly prepared for placing on the rim, securely fastened upon the rim, and finally finished up on the rim.

In the accompanying drawings, which illustrate a machine constructed in accordance with our invention, Figure 1 represents a view in rear elevation, the parts being in position for gripping the bands or wires of the tires. Fig. 2 represents a central transverse vertical sectional view of the parts shown in Fig. 1, partly in elevation. Fig. 3 represents a view of the machine in front elevation with a wheel in position thereon for stretching the tire. Fig. 4 represents a view in side elevation looking at the right-hand side of Fig. 3.

Like numerals indicate the same parts wherever they occur in the various figures of the drawings.

Rubber tires for wheels are usually provided with annular grooves to receive metal bands or wires for the purpose of bending the tires of the wheels upon rims. In some tires single metal bands are used for bending purposes, while in others several bands of wire are used.

In order to apply the machine here illustrated to either bands or wires, two constructions of clamps are required, one adapted for gripping the bands and the other the wires. In Fig. 3 the clamp on the right-hand side, which clamp is also illustrated in all of the other figures, is for use with metal bands, while the clamp shown on the left-hand side of Fig. 3 only is adapted for clamping bands of wire. The use of the clamp will be more fully described hereinafter.

Referring to the drawings by numerals, 1 and 2 indicate standards adapted to be secured to the floor or other support, which converge upwardly and terminate in the casting 3, in which are fitted to slide transversely rack-bars 4 and 5, the teeth of the former projecting downward and of the latter upward, so as to engage, respectively, the top and the bottom of the gear-wheel 6, mounted upon a pivot 7, carrying in the rear of the machine a lever 8, by means of which the gear-wheel is turned and the rack-bars moved in opposite directions simultaneously. Upon the outer ends of the rack-bars are mounted clamps, that upon the rack-bar 5 at the right-hand side of Fig. 3 (marked 9) being, as before stated, adapted for use with bands of metal and that upon the rack-bar 4 at the left of Fig. 3 (marked 10) being adapted for use with tires having bands of wire for binding purposes. In Fig. 1 both of the clamps are of the class marked 9, and when a rubber tire intended for use with a band of metal for binding purposes is to be prepared for the wheel the tire is placed, as shown at 11, with one end abutting at 12 against the outside of the clamp 9 on the right-hand side of Fig. 1 and the other end abutting against the outside of the clamp 9 on the left-hand side at 13 of Fig. 1, the ends of the bands of metal projecting from the annular groove of the tire through the clamp and overlapping each other in the central clamp 14, operated by means of the clamp-screw 15.

Upon the front of the casting 3 is secured a plate 16, from which projects a pintle 17, carrying a grooved roller 18.

Secured to the uprights 1 and 2 at the rear of the machine are crossed pieces 19 and 20, connected by vertical bars 21 and 22. A block 23 is fitted to slip in the space between the bars 21 and 22 and is provided with a spindle 24, projecting toward the front, upon which to journal the wheel to which the tire is to be applied, which is hereinbefore described. Upon the rear of the spindle is pivoted a ratchet-link 25.

Projecting rearwardly from the uprights 1 and 2 are the braces 26 and 27, the ratchet-link 28 being pivoted upon the screw 29, which secures the brace 26, cross-bar 20, and upright 2 together.

In operating to secure a rubber tire upon a wheel-rim by means of metal bands we first place the band in the annular groove of the rubber tire, with its ends projecting some distance beyond the end of the tire, and secure the rubber tire in the clamp in the position shown in Fig. 3 and hereinbefore described, overlapping ends of the band being tightly gripped by means of the screw 15 of the clamp 14. The set-screws of the clamps 9 are now released and the lever 8 turned from left to right, (looking from the front of the machine,) thus forcing the clamps 9 apart and away from the clamp 14, holding the bands and squeezing or crowding the ends of the tire against the outside of the clamps as the clamps are pressed apart, the rubber tire being contracted during this operation and pushed back from the ends of the bands. The rim of the wheel is now hung upon the pulley 18 within the tire, after which the set-screw holding the ends of the band is released and the clamp set-screws tightly set to firmly hold the ends of the bands. The lever is next turned from right to left, by means of which the clamps are moved toward each other and draw the ends of the band so as to lap each other and the rubber tire firmly against the periphery of the wheel. When the band has been drawn to the proper degree of tension, the two ends are brazed or otherwise firmly united together. By this means the ends of the metal band are fastened, but the ends of the rubber tire do not yet meet upon the wheel by from four to six inches. To bring these ends of the rubber tire together and make the entire wheel uniform, we now release all the clamps. The wheel is now placed upon the pivot 24 of the block 23, the ratchet-link 25 hooked upon a pin 30, projecting inward from the inner face of the lever 8, the lever 8 turned upon its axis in a direction to draw the ratchet-link upward, and the block 23 also. This carries up the wheel 31 on the spindle 24 and forces it tightly against the under face of the grooved roller 18, and the parts are maintained in this position by engaging the ratchet-link 28 with a pin 32 on the opposite arm of the lever 8. The wheel is now turned under the roller 18 toward each end of the rubber tire, respectively and successively, until the rubber is stretched sufficiently to cause its ends to meet, in which position they will be held by the metal band or wire; but the ends may be also cemented or otherwise secured together, if desired.

Secured to the casting 3 is a double-ended spring 33. When the machine is out of use, the lever 8 may be turned to a vertical position and the links 25 and 28 turned upward under the ends of said spring 33, which will hold them also in vertical positions, thus economizing in the space required to store the machine.

Having now described our invention, what we claim as new, and desire to secure by Letters Patent, is—

1. In a machine for securing rubber tires to wheels, the combination with a suitable standard of a casing mounted thereon, rack-bars slidably fixed in the casing and projecting in opposite directions, a gear-wheel between the rack-bars, means for turning the gear-wheel to simultaneously move the rack-bars in opposite directions, and clamps on the outer ends of the rack-bars, substantially as described.

2. In a machine for securing rubber tires to wheels, the combination with a suitable standard of a casing mounted thereon, rack-bars slidably fixed in the casing and projecting in opposite directions, a gear-wheel between the rack-bars, clamps on the outer ends of the rack-bars, an adjustable clamp located between the two clamps before mentioned for securing the projecting ends of the metal bands, and means for turning the gear-wheel to simultaneously move the rack-bars in opposite directions, substantially as described.

3. In a machine for securing rubber tires to wheels, the combination with a suitable standard of a casing mounted thereon, rack-bars slidably fixed in the casing and projecting in opposite directions, clamps on the outer ends of the rack-bars, a gear-wheel between the rack-bars, and a double-ended lever secured upon the spindle of the gear-wheel, substantially as described.

4. In a machine for securing rubber tires to wheels, the combination with a suitable standard of a casing mounted thereon, rack-bars slidably fixed in the casing and projecting in opposite directions, a gear-wheel between the rack-bars, a double-ended lever secured upon the spindle of the gear-wheel, a slidable block mounted in the frame and provided with a spindle to receive the wheel, a pin projecting from the double-ended lever, a ratchet-link pivoted to the sliding block, and means for securing the lever in any adjustment, substantially as described.

5. In a machine for securing rubber tires to wheels, the combination with a suitable standard of a casing mounted thereon, rack-bars slidably fixed in the casing and projecting in opposite directions, a gear-wheel between the rack-bars, a double-ended lever secured upon the spindle of the gear-wheel, a slidable block mounted in the frame and provided with a spindle to receive the wheel, a pin projecting from the double-ended lever, a ratchet-link pivoted to the sliding block, means for securing the lever in any adjustment, a second pin projecting from the opposite arm of the double-ended lever, and a ratchet-link pivoted to the frame and adapted to engage said second pin, substantially as described.

6. In a machine for securing rubber tires to wheels, the combination with a suitable standard of a casing mounted thereon, rack-bars slidably fixed in the casing and projecting in opposite directions, a gear-wheel between the rack-bars, a double-ended lever secured upon the spindle of the gear-wheel, a slidable block mounted in the frame and provided with a spindle to receive the wheel, a pin projecting from the double-ended lever, a ratchet-link pivoted to the sliding block, means for securing the lever in any adjustment, a second pin projecting from the opposite arm of the double-ended lever, a ratchet-link pivoted to the frame and adapted to engage said second pin, and a grooved roller mounted upon the rigid part of the frame in vertical alinement and above the sliding block, substantially as described.

7. The apparatus for manipulating rubber tires, comprising means for clamping both ends of the retaining-wire, and means for simultaneously compressing both ends of the rubber of the tire in opposite directions away from the ends of the retaining-wire.

In testimony whereof we hereunto affix our signatures in presence of two witnesses.

JOSEPH R. PLACE.
NATHAN A. KEYS.

Witnesses:
ALICE OLIVER,
GEO. K. COULTER.